(12) United States Patent
Kassler et al.

(10) Patent No.: US 9,302,655 B2
(45) Date of Patent: Apr. 5, 2016

(54) DRIVETRAIN

(75) Inventors: Helmut Kassler, Voitsberg (AT); Stefan Pichler, Landskron (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 776 days.

(21) Appl. No.: 13/643,828

(22) PCT Filed: Apr. 29, 2011

(86) PCT No.: PCT/EP2011/002157
§ 371 (c)(1),
(2), (4) Date: Jan. 2, 2013

(87) PCT Pub. No.: WO2011/134673
PCT Pub. Date: Nov. 3, 2011

(65) Prior Publication Data
US 2013/0199887 A1 Aug. 8, 2013

Related U.S. Application Data

(60) Provisional application No. 61/329,598, filed on Apr. 30, 2010.

(51) Int. Cl.
*B60K 17/04* (2006.01)
*B60T 1/00* (2006.01)
*B60K 7/00* (2006.01)
*B60W 30/18* (2012.01)

(52) U.S. Cl.
CPC ............... *B60T 1/005* (2013.01); *B60K 7/0007* (2013.01); *B60K 17/046* (2013.01); *B60W 30/18181* (2013.01); *B60K 2007/0038* (2013.01); *B60K 2007/0092* (2013.01)

(58) Field of Classification Search
None
See application file for complete search history.

(56) References Cited

U.S. PATENT DOCUMENTS

| 3,327,565 | A | * | 6/1967 | Grattan | F16D 67/00 192/221 |
| 3,670,597 | A | * | 6/1972 | Grattan | F16H 61/0293 192/221 |
| 2009/0118953 | A1 | * | 5/2009 | Nakamura | F16H 41/30 701/60 |

OTHER PUBLICATIONS

Office Action and Search Report for Chinese Patent Application No. 201180021747.X, mailed Nov. 20, 2015, 9 pages including 5 pages of English translation.

* cited by examiner

*Primary Examiner* — Erin D Bishop
(74) *Attorney, Agent, or Firm* — Jordan IP Law, LLC; Todd A. Vaughn

(57) ABSTRACT

A drivetrain of a motor vehicle having a parking lock for selectively locking the drivetrain, and having an electric motor and a power axle, which is permanently drive-coupled to the electric motor and which via a disconnect clutch can be selectively drive-coupled to at least one wheel of the motor vehicle. The parking lock and the disconnect clutch can be actuated by a common actuator.

17 Claims, 4 Drawing Sheets

DRIVETRAIN

CROSS-REFERENCE TO RELATED APPLICATIONS

The present application is a National Stage Application of PCT International Application No. PCT/EP2011/002157 (filed on Apr. 29, 2011), under 35 U.S.C. §371, which claims priority to U.S. Provisional Patent Application No. 61/329,598 (filed on Apr. 30, 2010), which is hereby incorporated by reference in its entirety.

FIELD OF THE INVENTION

The present invention relates to a drivetrain of a motor vehicle having a parking lock for selectively locking the drivetrain, and having an electric motor and a power axle, which is permanently drive-coupled to the electric motor and which via a disconnect clutch can be selectively drive-coupled to at least one wheel of the motor vehicle.

BACKGROUND OF THE INVENTION

Drivetrains of the type described above are used, in particular, in electric or hybrid vehicles. The parking lock here serves to secure the vehicle in a state when the engine is switched off. The disconnect clutch serves to disengage the electric motor from the wheel, for example in order to allow idling. In the case of a hybrid vehicle, for example, isolating the wheel and the electric motor may serve to prevent the electric motor from also turning when the vehicle is being driven at higher speeds solely by an internal combustion engine. Such a disconnect clutch is also important in pure electric vehicles, however, in order to be able to disengage the mechanical connection between the wheel and the electric motor, for instance in the event of a fault.

The overall space available for the drivetrain in a motor vehicle is generally very limited. In addition, the respective functions of the parking lock and the disconnect clutch must be available at all times. For actuating the parking lock and the disconnect clutch separate actuators are conventionally provided, which increase the manufacturing costs of the drivetrain and moreover take up a considerable amount of overall space.

SUMMARY OF THE INVENTION

An object of the present invention, therefore, is to create a drivetrain which is reliable in operation and at the same time is of a simple, compact construction.

This object is achieved by a drivetrain of a motor vehicle having a parking lock for selectively locking the drivetrain, and having an electric motor and a power axle or intermediate shaft, which is permanently drive-coupled to the electric motor and which via a disconnect clutch can be selectively drive-coupled to at least one wheel of the motor vehicle, wherein the parking lock and the disconnect clutch can be actuated by a common actuator.

In accordance with the invention the parking lock and the disconnect clutch can be actuated by a common actuator. A separate actuator is therefore not provided for each of the two said functional units. The use of a common actuator, which serves for actuating both the parking lock and the disconnect clutch, reduces the number of components required, which has an advantageous impact on the manufacturing and assembly costs of the drivetrain. In addition, the drivetrain in accordance with the invention can be of more compact design than comparable drivetrains of known construction.

The parking lock and the disconnect clutch can be actuated in an axial direction, in particular along a common axis.

The parking lock, the disconnect clutch and/or the power axle may be arranged coaxially.

In order to ensure a reliable operation of the drivetrain at all times, the actuator may be configured in such a way that the parking lock can be actuated only when the disconnect clutch is in a closed state. This serves to ensure that the wheel is automatically coupled to the power axle, when the parking lock is engaged. This is particularly important if the parking lock is arranged so that it will bring about a locking of the drivetrain by locking the electric motor or the power axle, since in the absence of the automatic safety function described above, the wheel can rotate freely with the disconnect clutch opened, although the parking lock is activated and said components are locked.

An actuating movement for actuation of the parking lock and an actuating movement for opening the disconnect clutch are in particular directed in opposite directions.

The disconnect clutch may comprise an axially traversable clutch part, which is assigned to an axle portion, which is coupled, rotationally fixed, to the wheel of the motor vehicle. For example, said clutch part is of sleeve-like design and is coupled to the axle portion by a linear bearing so that it is rotationally fixed but axially traversable.

The actuator may comprise an axially displaceable sliding sleeve, which partially encloses the power axle, and which can be moved by an actuating shaft, which is at least in part coaxially guided by the power axle. In other words, when viewed in a radial direction, the power axle is arranged at least partially between the sliding sleeve and the actuating shaft. In a simple design configuration of an actuating mechanism of the sliding sleeve, the sliding sleeve is coupled to the actuating shaft, so that it is axially displaceable, by a pin which extends at least partially in a radial direction.

For actuating the disconnect clutch, the sliding sleeve may be capable of selective coupling, directly or indirectly, to the axially traversable clutch part of the disconnect clutch, in order to traverse the clutch part axially.

The actuator may comprise an elastic element, which serves to produce a bias, which brings about a closing of the disconnect clutch. For example, the elastic element is a spring, which acts on the axially traversable clutch part by way of the actuating shaft and the sliding sleeve and in the absence of any active actuation by the actuator presses it into a closed state of the disconnect clutch.

A space-saving coupling of the electric motor to the power axle may comprise a planetary transmission, for example. This embodiment proves advantageous particularly in the case of coaxial arrangement of the rotor and the power axle, in which the axle extends at least partially through the rotor.

An efficient locking of the drivetrain is achieved if the parking lock is configured in such a way that an actuation of the parking lock brings about a locking of the planetary transmission.

In accordance with one embodiment, the parking lock comprises a parking lock sleeve, which is rotationally fixed to the rotor of the electric motor. If the rotor, for example, is further coupled, so that it is rotationally fixed, to a sun wheel of a planetary transmission embodied as a reduction gear, whilst the power axle is coupled so that it is rotationally fixed to a planet carrier of the planetary transmission, or vice-versa, a locking of the drivetrain can be brought about by coupling and rotationally fixing the parking lock sleeve directly to the power axle through an actuation of the parking lock. In this situation an "input" and an "output" of the planetary transmission are bypassed and a rotation of the components involved is prevented owing to the reduction of the planetary transmission, provided, for example, by two-stage planet gears.

The parking lock sleeve can be coupled to the power axle by a sleeve which is selectively axially traversable by the sliding sleeve and which is coupled, rotationally fixed, to the power axle, and which can be brought into engagement with the parking lock sleeve.

In many cases the overall space available for the electrical drive in a vehicle having an electrical rear-axle drive is severely limited owing to the ground clearance requirements of the motor vehicle. The required axle kinematics and the resulting axle structure impose further constraints, which define the overall space to be provided for the drivetrain.

In accordance with a further embodiment the electric motor therefore comprises a stator and a rotor, the parking lock and the disconnect clutch being arranged at least partially, in particular entirely in the rotor. The at least partial integration of the parking lock and the disconnect clutch into the interior of the rotor results in a very compact configuration of the drivetrain, particularly when viewed in an axial direction of the electric motor. Furthermore, the spatial proximity of the functional components of the drivetrain moreover creates an optimized "package," which is also easier to assemble than conventional drivetrains.

In accordance with one embodiment the rotor is embodied as a hollow shaft, through which the power axle at least partially extends. The hollow shaft may also accommodate the parking lock and the disconnect clutch.

The invention further relates to a motor vehicle having a front axle and a rear axle and having a drivetrain in accordance with at least one of the embodiments described above, wherein the front axle and/or the rear axle in each case comprise two power axles, to each of which a separate electric motor is assigned. In other words a separate drivetrain is assigned to each half shaft of the front axle and/or the rear axle, so that a drive torque can be specifically and individually delivered to the individual wheels of the respective vehicle axle, which is also referred to as "torque vectoring." In addition, with this configuration it is possible to use more compact electric motors than in motor vehicles which have only one electric motor per axle or even just one single electric motor for propelling the motor vehicle.

Further embodiments of the invention are specified in the claims, the description and the drawings.

BRIEF DESCRIPTION OF THE DRAWINGS

The present invention is explained purely by way of example on the basis of an advantageous embodiment, referring to the drawings attached, of which.

DETAILED DESCRIPTION OF EMBODIMENTS

Figure 1:
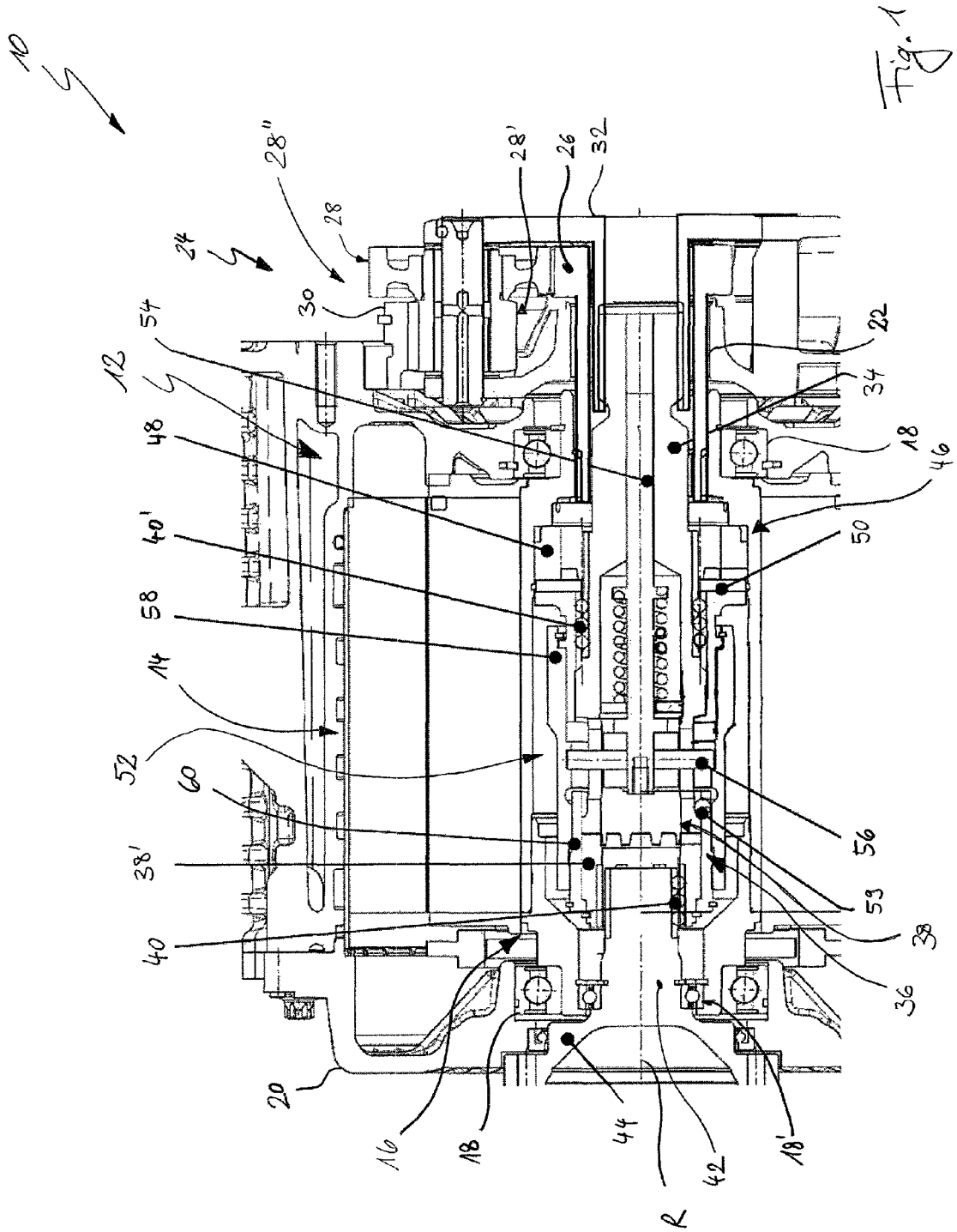
FIG. 1 illustrates an embodiment of the drivetrain in accordance with the invention having an actuator for actuating a disconnect clutch and a parking lock.

FIG. 1 illustrates a drivetrain 10 having an electric motor 12. The electric motor 12 serves for driving a half shaft of a rear axle of a motor vehicle. The rear axle is of symmetrical construction, that is to say an electric motor is likewise assigned to the other half shaft (not illustrated) of the rear axle. Since a separate electric motor is therefore assigned to each of the wheels (not illustrated) connected to the rear axle, these can be supplied with drive torque individually and separately from one another. This allows a "torque vectoring", that is to say a distribution of the drive torque to the wheels of the rear axle that is specific to the driving situation, in order to be able to adapt the driving dynamics of the motor vehicle to the conditions prevailing at any given time.

The electric motor 12 comprises a stator 14 and a rotor 16. The rotor 16 is supported in a housing 20 by bearing 18.

The drive torque generated by the electric motor 12 is transmitted from the rotor 16 via a hollow shaft portion 22 to a planetary transmission 24. The planetary transmission 24 comprises a sun wheel 26, which is connected to the hollow shaft portion 22 and which meshes with a first planet gear 28. The first planet gear 28 is rotationally fixed to a second planet gear 28', which has a smaller diameter than the first planet gear 28. The second planet gear 28' meshes with a ring gear 30, which is fixed so that it cannot rotate in the housing 20. The planet gears 28, 28' together form a two-stage planet wheel 28", which is rotatably arranged on a planet carrier 32. By virtue of the two-stage construction of the planet wheel 28" the planetary transmission 24 is a reduction gear, which brings about a geared-down driving of the planet carrier 32 through a drive movement of the sun wheel 26.

The planet carrier 32 is rotationally fixed to an intermediate shaft or power axle 34, which extends coaxially into the rotor 16 and passes virtually right through the latter in its longitudinal extent. A disconnect clutch 36 is arranged at an end of the intermediate shaft 34 remote from the planetary transmission 24. The disconnect clutch 36, which is embodied as a claw clutch, comprises a clutch part 38, which is rotationally fixed to the intermediate shaft 34 and which can be selectively coupled to an axially displaceable clutch part 38'. The disconnect clutch 36 is illustrated in a closed state.

By means of a linear bearing 40 the clutch part 38' is connected so that it is axially displaceable but rotationally fixed to an axle portion 42, which extends into the rotor 16 and which is in turn integrally formed with a flange 44 for fixing a wheel of the motor vehicle. The axle portion 42 is supported in the rotor 16 by a bearing 18'.

The drivetrain 10 can be locked by a parking lock 46, for example in order to prevent the motor vehicle rolling away when parking. The parking lock 46 comprises a parking lock sleeve 48, which is rotationally fixed to the rotor 16, and a sleeve 50, which is coupled to the intermediate shaft 34 by a linear bearing 40' so that it is axially displaceable but rotationally fixed.

Like the axially traversable clutch part 38', the sleeve 50 can be displaced by an actuator 52 in an axial direction of an axis of rotation R of the electric motor 12 and the intermediate shaft 34. Such a displacement can be produced by an actuating shaft 54, which is coupled by pins 56 to an axially displaceable sliding sleeve 58. The sliding sleeve 58 is directly connected to the sleeve 50. An actuation of the disconnect clutch 36 is effected through a selective coupling by a ball 59 having a pressure sleeve 60, which is in turn connected to the clutch part 38'.

The working principle of the actuator 52 is explained in more detail below.

Figure 2:
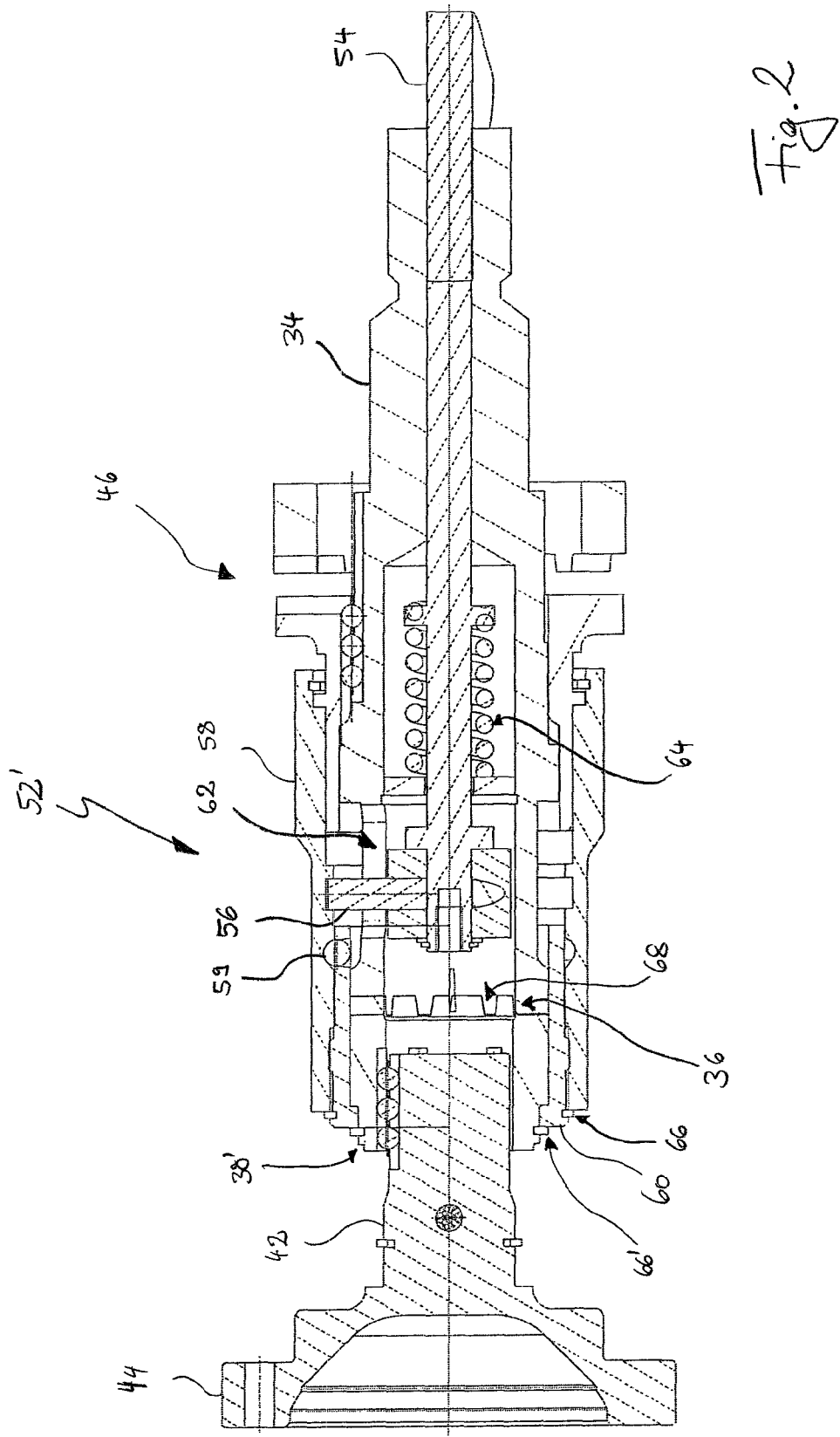
FIG. 2 illustrates an embodiment of the actuator with the disconnect clutch closed and the parking lock deactivated.

FIG. 2 illustrates a slightly modified embodiment 52' of the actuator. In particular the intermediate shaft 34, in contrast to that of the actuator 52, has only one elongated hole 62, through which a pin 56 extends. Functionally, however, the actuators 52, 52' are substantially identical. In principle any number of pins 56 and corresponding elongated holes 62 may be provided.

In FIG. 2 the actuator 52' defines a closed position of the disconnect clutch 36. The parking lock 46 is opened. In order to open the disconnect clutch 36 the sliding sleeve 58 must be displaced from the position illustrated in FIG. 2 to the left. Such a displacement is produced by a suitable translational movement of the actuating shaft 54, which is transmitted to the sliding sleeve 58 via the pin 56. The movement of the actuating shaft 54, extending coaxially through the intermediate shaft 34, needed to actuate the sliding sleeve 58 is produced by a mechanism not illustrated in more detail.

When the actuating shaft 54 moves to the left, a spring force generated by a spring 64 must be overcome, since the spring 64 generates a bias, which keeps the disconnect clutch 36, and also the parking lock 46, in a closed position, as long as the actuator 52' does not force an opening movement.

As the sliding sleeve 58 moves to the left the pressure sleeve 60 is likewise moved to the left, since the sliding sleeve 58 strikes against a retaining ring 66 connected to the pressure sleeve 60. The pressure sleeve 60 in turn strikes against a retaining ring 66', which is arranged on the clutch part 38'. As already described, the clutch part 38' is axial traversable, so that the actuating movement of the sliding sleeve 58 to the left, starting from the situation illustrated in FIG. 2, brings about a movement of the clutch part 38' to the flange 44, so that claws 68 of the clutch parts 38, 38' disengage. The axle portion 42 is then isolated from the electric motor 12. This state is illustrated by the actuator 52 in FIG. 3.

In order to close the disconnect clutch 36, the sliding sleeve 58 is moved to the right again. On the implicit understanding that basically multiple balls 59 may also be provided, which in particular are arranged uniformly distributed in a circumferential direction, the pressure sleeve 60 is coupled to the sliding sleeve 58 by the ball 59 and is consequently also moved to the right. As soon as the clutch parts 38, 38' are fully engaged and an axial movement of the clutch part 38' is no longer possible, a further movement of the pressure sleeve 60 to the right is also locked. The state illustrated in FIG. 2 is then again reached.

In the event of a further movement of the sliding sleeve 58 to the right, the ball 59 is pressed radially inwards, so that the coupling of the pressure sleeve 60 to the sliding sleeve 58 is cancelled in respect of movements in an axial direction.

Figure 4:
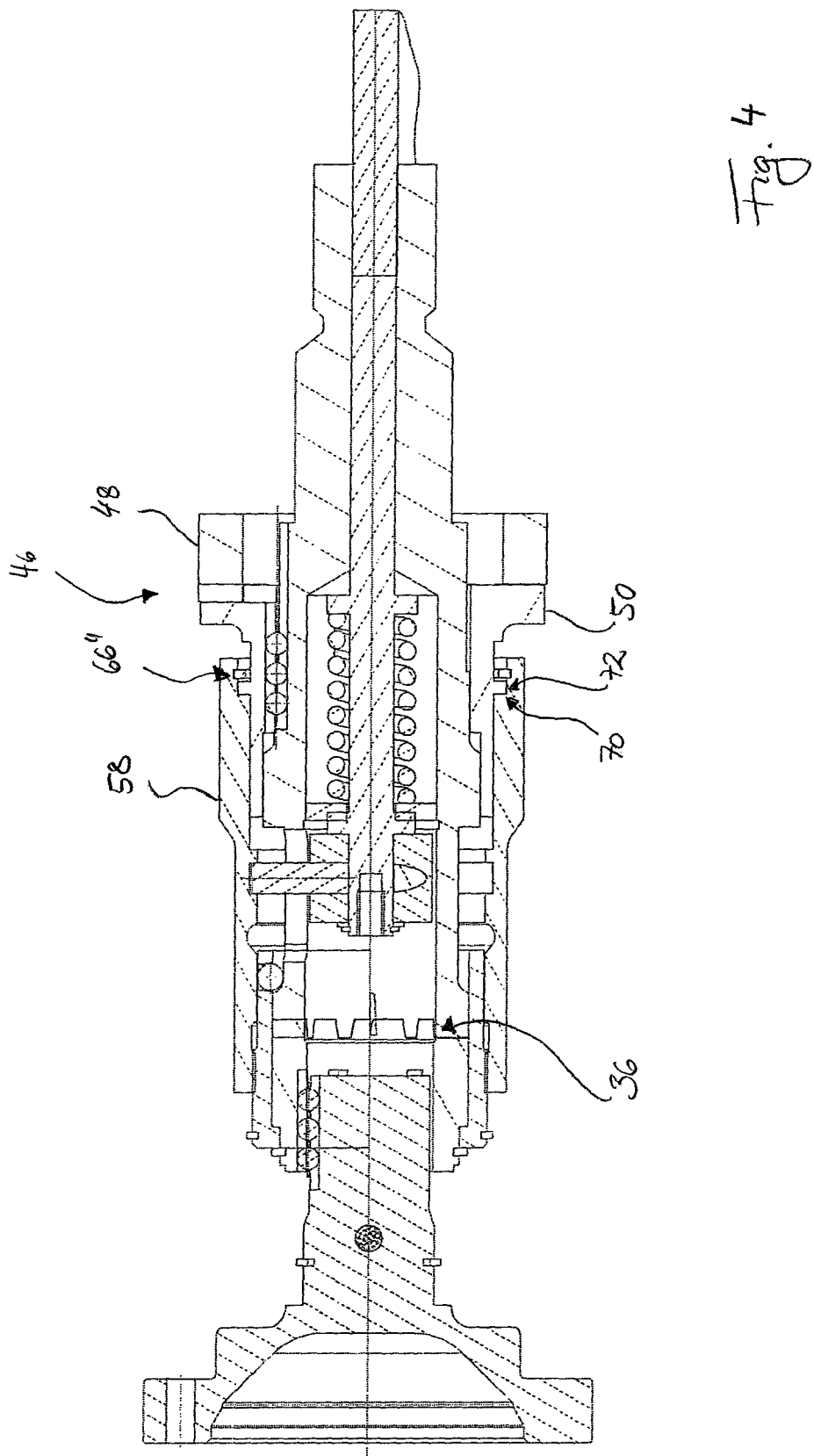
FIG. 4 illustrates the actuator illustrated in FIG. 2 with the parking lock activated.

FIG. 4 illustrates an activated state of the parking lock 46. To activate the parking lock 46, the sliding sleeve 58 is moved further to the right, starting from the situation represented in FIG. 2. In moving to the right the sliding sleeve 58 carries the sleeve 50 with it over a shoulder 70, which interacts with a corresponding web 72 on the sleeve 50. The joint traversing of the sliding sleeve 58 and the sleeve 50 means that the latter is brought into engagement with the parking lock sleeve 48. Since this, as already described, is rotationally fixed to the rotor 16, the planetary transmission 24 is bypassed, that is to say the planet carrier 32 and the sun wheel 26 are ultimately coupled and rotationally fixed to one another. Since the planetary transmission 24, by virtue of the different diameter of the planet gears 28, 28', functions as a reduction gear, a locking occurs when, for example, a torque acts on the planet carrier 32 due, for example, to a grade resistance acting on the vehicle, which is caused by an inclined slope of a parking lot on which the vehicle is stationed.

FIG. 4 illustrates that an actuation of the parking lock 46 is possible only when the disconnect clutch 36 is also closed. This leads to a reliable and safe construction of the drivetrain 10.

Figure 3:
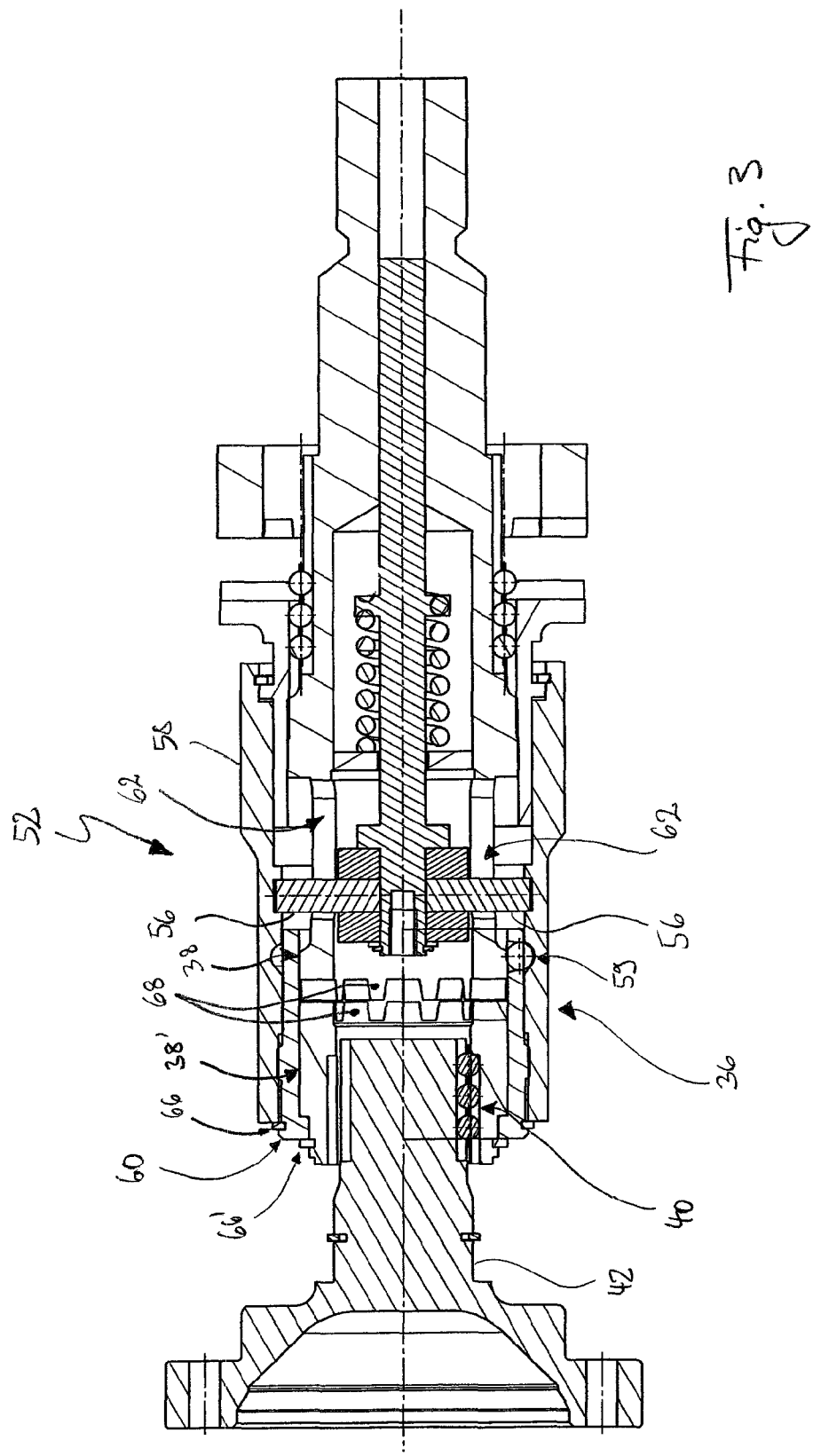
FIG. 3 illustrates the embodiment of the actuator illustrated in FIG. 1 with the disconnect clutch opened and the parking lock deactivated.

In order to open the parking lock 46, the sliding sleeve 58 is displaced to the left starting from the situation illustrated in FIG. 3, the sliding sleeve carrying the sleeve 50 with it by a retaining ring 66" affixed thereto. The rotationally fixed connection between the sleeve 50 and the parking lock sleeve 48 is thereby cancelled and the planetary transmission 24 is no longer locked.

From the explanations above it can be seen that the actuator 52, 52' firstly ensures a reliable operation of the drivetrain 10, since the disconnect clutch 36 and the parking lock 46 can be actuated only in a well-defined manner.

Moreover, the construction of the actuator 52, 52' is very robust, since the axially moveable components are arranged coaxially. This also results in a compact, radially "nested" construction of the actuator 52, 52'. The compact construction of the actuator 52, 52' allows it to be arranged entirely in the rotor 16, which in turn affords a compact construction of the overall drivetrain 10, particularly in an axial direction. The actuator 52, 52' is moreover protected inside the rotor 16.

The configuration of the drivetrain 10 described above ultimately affords a module which can easily be fitted in a vehicle. That is to say the drivetrain 10 combines both the power unit and safety-relevant functional units in one compact "package". This also makes it possible to assign a separate drivetrain 10 to each wheel of an axle of the vehicle.

In addition to the advantages described above, a further outstanding feature of the drivetrain 10 is a cost-effective construction, since only one actuator 52, 52' is required in order to actuate both the disconnect clutch 36 and the parking lock 46. Besides reducing the manufacturing and assembly costs, the susceptibility of the overall system to faults is thereby also reduced.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE NUMERALS 10 drivetrain
12 electric motor
14 stator
16 rotor
18, 18' bearing
20 housing
22 hollow shaft portion
24 planetary transmission
26 sun wheel
28, 28', 28" planet gear
30 ring gear
32 planet carrier
34 intermediate shaft
36 disconnect clutch
38, 38' clutch part
40, 40' linear bearing
42 axle portion
44 flange
46 parking lock
48 parking lock sleeve
50 sleeve 52, 52' actuator
54 actuating shaft
56 pin
58 sliding sleeve
59 ball
60 pressure sleeve
62 elongated hole
64 spring
66, 66', 66" retaining ring
68 claw
70 shoulder
72 web
R axis of rotation

What is claimed is:

1. A drivetrain of a motor vehicle, the drivetrain comprising:
   a parking lock configured to selectively lock the drivetrain;
   an electric motor;
   a power axle which is permanently drive-coupled to the electric motor and which via a disconnect clutch can be selectively drive-coupled to at least one wheel of the motor vehicle; and
   an actuator configured to actuate the parking lock and the disconnect clutch, wherein the actuator is configured such that the parking lock is actuated only when the disconnect clutch is in a closed position.

2. The drivetrain of claim 1, wherein the parking lock and the disconnect clutch are configured for actuation in a respective axial direction.

3. The drivetrain of claim 1, wherein the parking lock, the disconnect clutch and/or the power axle are arranged coaxially.

4. The drivetrain of claim 1, wherein an actuating movement for actuating the parking lock and an actuating movement for opening the disconnect clutch are directed in opposite directions.

5. The drivetrain of claim 1, wherein the disconnect clutch comprises an axially traversable clutch part, which is assigned to an axle portion, which is rotationally couple to the wheel of the motor vehicle.

6. The drivetrain of claim 1, wherein the actuator comprises an axially displaceable sliding sleeve, which partially encloses the power axle and which is moveable by an actuating shaft, which is coaxially guided by the power axle.

7. The drivetrain of claim 6, wherein the sliding sleeve is coupled to the actuating shaft for axial displacement, by a pin which extends at least partially in a radial direction.

8. The drivetrain of claim 7, wherein the sliding sleeve is configured for selective coupling to an axially traversable clutch part of the disconnect clutch, in order to traverse the clutch part axially.

9. The drivetrain of claim 1, wherein the actuator comprises an elastic element configured to produce a bias which brings about a closing of the disconnect clutch.

10. The drivetrain of claim 1, further comprising a planetary transmission to drive couple the electric motor to the power axle.

11. The drivetrain of claim 10, wherein the parking lock is configured such that an actuation of the parking lock brings about a locking of the planetary transmission.

12. The drivetrain of claim 10, wherein the parking lock comprises a parking lock sleeve which is rotationally fixed to a rotor of the electric motor.

13. The drivetrain of claim 12, wherein the parking lock comprises the sleeve which is selectively axially traversable by the parking lock sleeve, the sleeve being rotationally coupled to the power axle.

14. The drivetrain of claim 1, wherein the electric motor comprises a stator and a rotor, the parking lock and the disconnect clutch being arranged in the rotor.

15. The drivetrain of claim 14, wherein the rotor comprises a hollow shaft, through which the power axle at least partially extends coaxially.

16. A motor vehicle comprising:
    a drivetrain including an electric motor, a front axle which is permanently drive-coupled to the electric motor and which via a disconnect clutch is to be selectively drive-coupled to at least one wheel of the motor vehicle, a rear axle which is permanently drive-coupled to the electric motor and which via a disconnect clutch is to be selectively drive-coupled to at least one wheel of the motor vehicle, and an actuator configured to actuate the parking lock and the disconnect clutch, a planetary transmission to drive couple the electric motor to the power axle; and a parking lock to selectively lock the drivetrain, wherein the actuator is configured such that the parking lock is actuated only when the disconnect clutch is in a closed position.

17. A motor vehicle comprising:
    a drivetrain, the drivetrain including a parking lock to selectively lock the drivetrain, an electric motor having a stator and a rotor, a front axle which is permanently drive-coupled to the electric motor and which via a disconnect clutch is to be selectively drive-coupled to at least one wheel of the motor vehicle, a rear axle which is permanently drive-coupled to the electric motor and which via a disconnect clutch is to be selectively drive-coupled to at least one wheel of the motor vehicle, and an actuator configured to actuate the parking lock and the disconnect clutch, wherein an actuating movement for actuating the parking lock and an actuating movement for opening the disconnect clutch are directed in opposite directions, and the actuator is configured such that the parking lock is actuated only when the disconnect clutch is in a closed position.

* * * * *